(12) United States Patent
Frank

(10) Patent No.: US 7,269,527 B1
(45) Date of Patent: Sep. 11, 2007

(54) SYSTEM INTEGRATION MODULE FOR CBRNE SENSORS

(75) Inventor: David L. Frank, Boca Raton, FL (US)

(73) Assignee: Innovative American Technology, Inc., Boca Raton, FL (US)

( * ) Notice: Subject to any disclaimer, the term of this patent is extended or adjusted under 35 U.S.C. 154(b) by 0 days.

(21) Appl. No.: 11/624,089

(22) Filed: Jan. 17, 2007

Related U.S. Application Data

(60) Provisional application No. 60/779,467, filed on Mar. 6, 2006, provisional application No. 60/759,373, filed on Jan. 17, 2006, provisional application No. 60/759,332, filed on Jan. 17, 2006.

(51) Int. Cl.
*G06F 19/00* (2006.01)
(52) U.S. Cl. .......................... 702/108; 702/19; 702/22; 702/23; 702/24; 702/25; 702/26; 702/27; 702/28; 702/29; 702/30; 702/31; 702/32; 702/60; 702/64; 702/76; 702/85; 702/104; 702/122; 702/127; 702/183; 702/187; 702/188; 702/189; 340/286.01; 340/286.02; 709/245; 376/156; 356/72
(58) Field of Classification Search .................. 702/19, 702/22–32, 60, 64, 76, 85, 104, 108, 122, 702/127, 183, 187–189; 340/286.01, 286.02; 709/245; 73/866.1; 376/156; 378/57; 356/72, 356/73, 301
See application file for complete search history.

(56) References Cited

U.S. PATENT DOCUMENTS 6,847,731 B1 * 1/2005 Caulfield .................... 382/159
7,034,677 B2 * 4/2006 Steinthal et al. ....... 340/539.12
7,119,676 B1 * 10/2006 Silverstrim et al. ......... 340/531

\* cited by examiner

*Primary Examiner*—Hal Wachsman
*Assistant Examiner*—Phuong Huynh
(74) *Attorney, Agent, or Firm*—Jose Gutman; Fleit Kain Gibbons Gutman Bongini & Bianco P.L.

(57) ABSTRACT

A sensor interface system and a sensor integration module support individual sensors and sensor arrays, with network connectivity and critical functions required for analog and digital sensors when deployed in field applications used for chemical, biological, radiation, nuclear and explosives (CBRNE) material identification. The sensor integration module enables efficient integration of a single sensor or for multiple sensors into an array using a modular sensor interface unit and provides individual TCP/IP addresses for each detector element, signal processing for the sensor data and communications capabilities establishing each detector and the sensor array as network elements on a distributed network.

19 Claims, 8 Drawing Sheets

SYSTEM INTEGRATION MODULE FOR CBRNE SENSORS

CROSS REFERENCE TO RELATED APPLICATIONS

This application is based on, and claims priority from co-pending U.S. Provisional Patent Application No. 60/759,373, filed on Jan. 17, 2006, entitled "Distributed Sensor Network with Common Platform for CBRNE Devices", U.S. Provisional Patent Application No. 60/759,332, filed on Jan. 17, 2006, entitled "Sensor Interface Unit and Method for Automated Support Functions for CBRNE Sensors", and U.S. Provisional Patent Application No. 60/779,467 filed on Mar. 6, 2006, entitled "Digital Network Enabled Radiation Sensors"; the collective entire disclosure of which being hereby incorporated by reference.

FIELD OF THE INVENTION

The present invention generally relates to sensor systems for identifying hazardous materials including chemical, biological, radiation, nuclear and explosive (CBRNE) materials, and more particularly to a sensor interface system with modular design and with network communications capability.

DESCRIPTION OF RELATED ART

Current technologies offer computer connectivity for analog sensors through dedicated connections such DB9 and USB ports that configure the sensor as a peripheral device to a dedicated computer. Other devices offer calibration as a separate function and hardware, in addition to the dedicated computer connection with the sensor. These separate devices associated with the sensors are not distributed network elements with automated calibration and support functions to allow for independent field deployment of the sensors. With the advent of terrorist activities across the world there is a strong demand for sensor systems that offer independent network elements that can be deployed across a distributed sensor network.

Also, current sensor systems deployed for chemical, biological, radiation, nuclear and explosives (CBRNE) detection do not have the capability for highly accurate calibration of analog sensors. With the growing need for CBRNE sensor systems that provide detection, identification and quantification of specific chemical, biological, radiation, nuclear and explosive materials through the use of spectral analysis software, highly accurate calibration and synchronization of a sensor array are needed.

Therefore a need exists to overcome the problems with the prior art as discussed above.

SUMMARY OF THE INVENTION

According to an embodiment of the present invention, a sensor interface system and a sensor integration module (SIM) provide an efficient system and integrated module for deploying one or more sensors on a distributed data network to provide spectral data for analysis at a remote processor. The SIM provides a modular interface to one or more types of sensors.

According to an embodiment of the present invention, the Sensor Integration Module (SIM) supports functions for sensor systems designed to identify specific hazardous materials with analog or digital detectors. The SIM provides the ability to combine multiple sensors into an organized array with individual addressing of each sensor and communications capabilities to enable distributed network architecture. The SIM provides the capability to pass the spectral data to a remote multi-channel analyzer or to accumulate the spectral data from each sensor over time and create a histogram of each sensor data or a composite of a group of sensors from the data captured and to forward the spectral data to an analysis system. To support the calibration and synchronization of the one or more detectors supported by the SIM provides auto calibration and maintenance of the calibration through an auto-gain control device. This system also provides an automated calibration verification capability. The analog and digital sensor interfaces are mounted on a daughter board that can be connected to the main SIM processor board. This enables a rapid change of analog or digital interface types without impact to the main SIM processor board.

The Sensor Integration Module (SIM), according to one embodiment, enables efficient integration of multiple sensors into an array using a modular sensor interface unit providing individual TCP/IP addresses for each detector element, signal processing for the array and communications capabilities establishing each detector and the sensor array as network elements on a distributed network. The distributed network can include a wide area network such as the internet. The SIM provides support functions such as sensor calibration methods, automated gain control to eliminate analog drift, and automated calibration verification processes are important issues when sensors are used to provide data to be used in material identification. Automated calibration and support functions for deployed sensor arrays allow for independent field deployment.

One embodiment of the present invention enables a wide variety of analog and digital sensors to be deployed as network elements supporting material detection and identification systems for field deployment. Furthermore, the embodiment provides a modular architecture and design for the Sensor Integration Module that utilizes daughter boards for the specific sensor interfaces to enable a modular interface to any commercial off the shelf or proprietary sensor with minimal impact to the sensor interface design.

DETAILED DESCRIPTION

Figure 1:
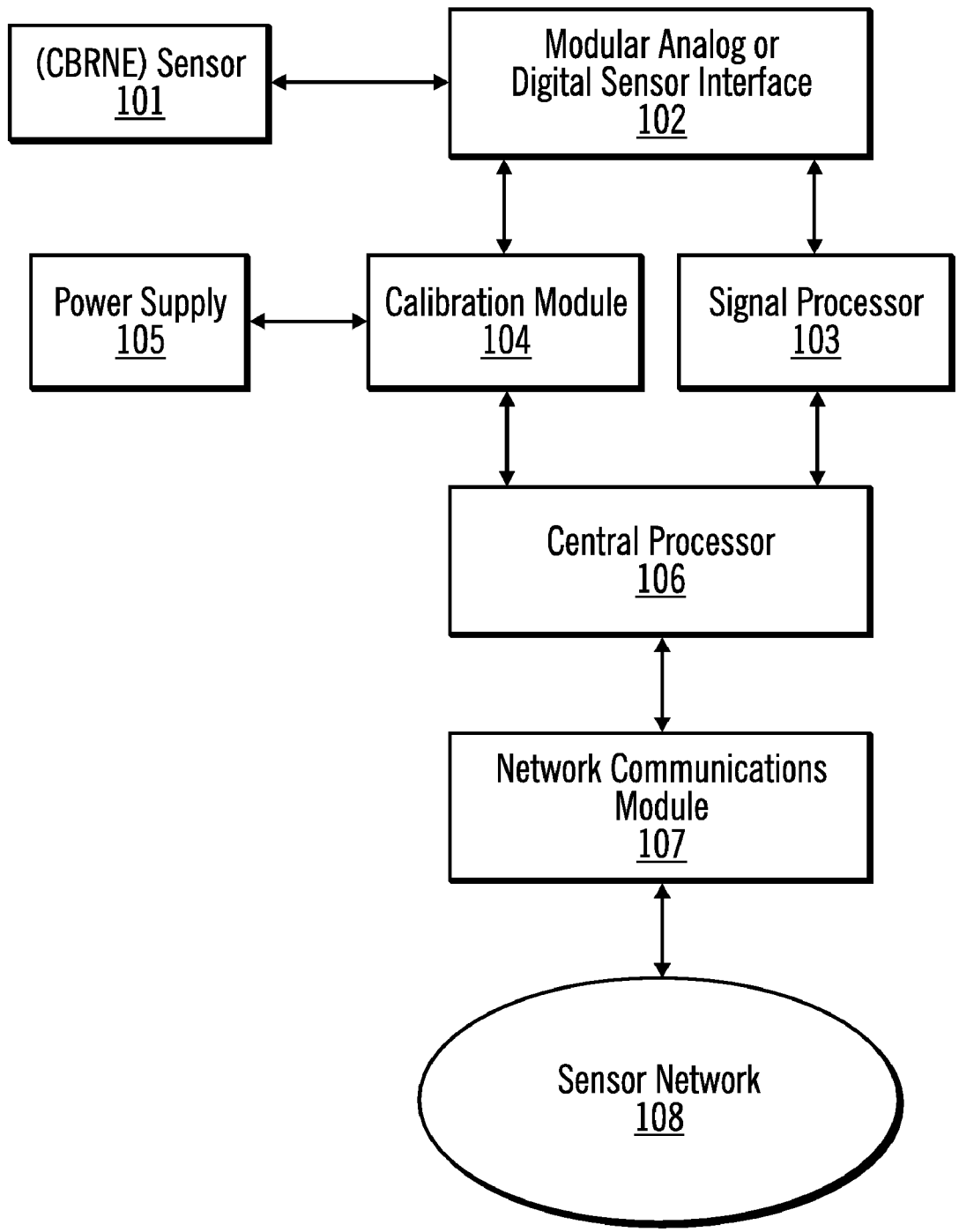
FIG. 1 is a simple functional block diagram illustrating functional components of an example of a sensor interface system and a sensor integration module.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The present invention, according to an embodiment, overcomes problems with the prior art by providing a system and methods the support of individual sensors and for sensor arrays, network connectivity and critical functions required for analog and digital sensors when deployed in field applications used for chemical, biological, radiation, nuclear and explosives (CBRNE) material identification.

Described now is an exemplary Sensor Integration Module connected to a digital network for spectral analysis, according to exemplary embodiments of the present invention.

Figure 2:
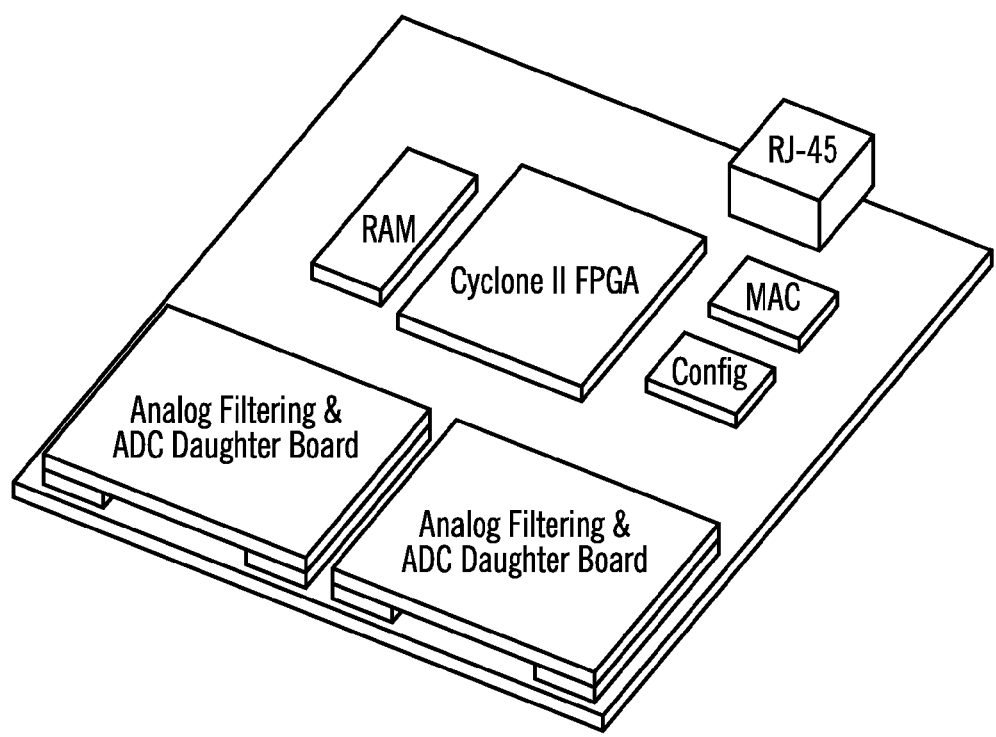
FIG. 2 is a perspective view of an example of a sensor integration module (SIM) with analog and digital components on a daughter board.

An exemplary SIM is illustrated in FIGS. 1 and 2. A function of the Sensor Integration Module (SIM) is to provide a modular interface (102) to the detectors (101) and process the raw signal from the detectors (103), and provide support functions for the detectors (106), and provide calibration monitoring (106) and provide digital calibration methods (104) and provide individual TCP/IP addresses for each detector and SIM and network connectivity (107) to send the processed detector data over the network (108) to the remote server for analysis.

Figure 8:
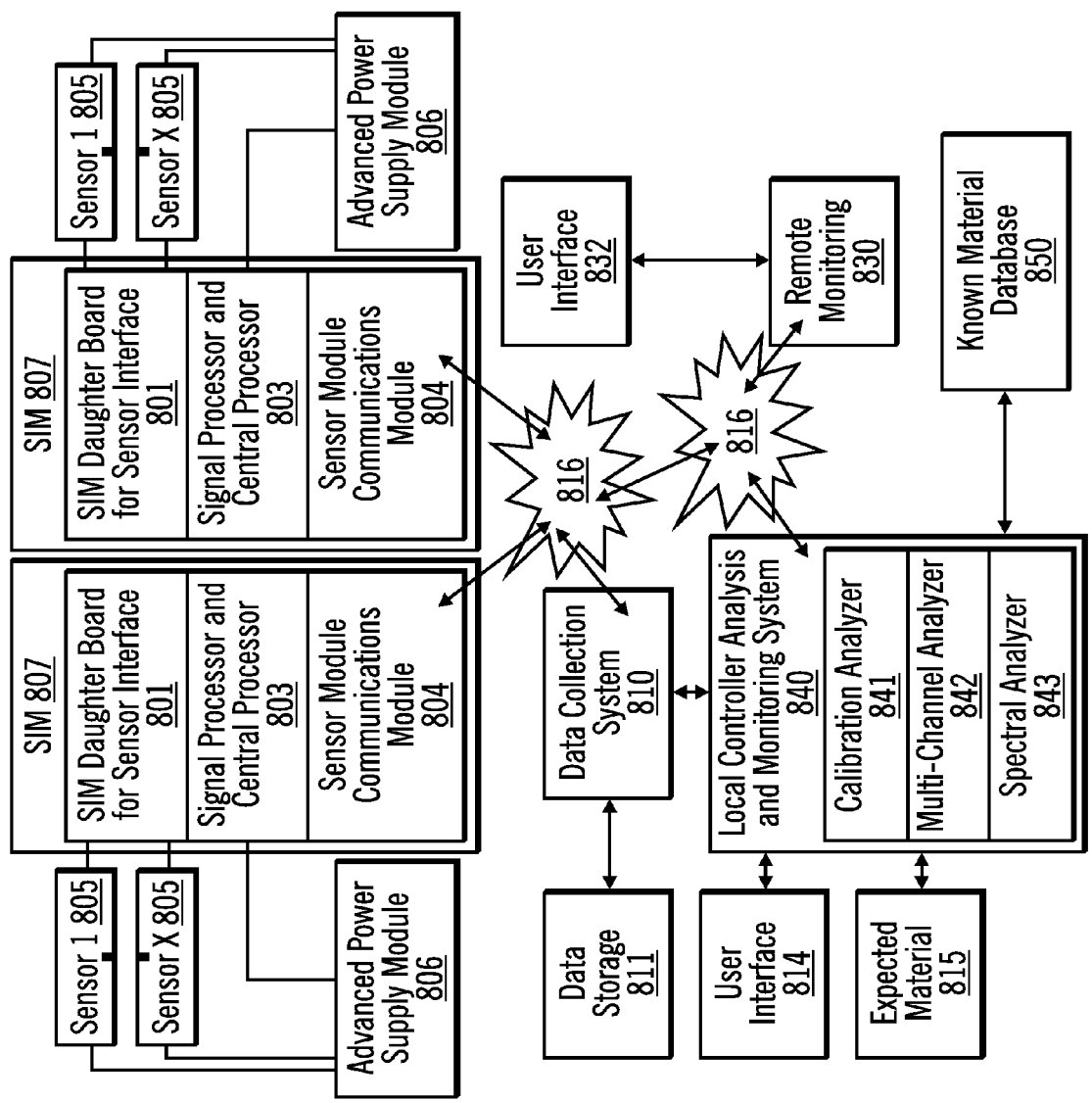
FIG. 8 is a functional block diagram illustrating an example of a Sensor Integration Module deployed in a distributed sensor network configuration.

An exemplary SIM, sensors and digital network system such as illustrated in FIG. 8, provides significantly improved efficiency and deployment capabilities over existing detector configurations.

FIG. 8 illustrates example of a Sensor Integration Module with sensor(s) 805 and sensor interface(s) 801 connected, a signal processor and central processor 803, digital communications (804) and power supply (806). The inventive features and advantages of exemplary embodiments of a digital network radiation detection and identification system will be discussed below. However, it is assumed that the reader has an understanding of radiation and sensor technologies.

Referring to FIG. 8, an exemplary SIM with sensor(s) enables connectivity to a distributed sensor network system, analog including. The sensors 805 are communicatively coupled with a data collection system 810 and sensor integration module 807. Each sensor is assigned an individual network address to identify the sensor for network access.

With reference to FIG. 8, a data collection system (810), in this example, is communicatively coupled via cabling, wireless communication link, and/or other communication link (816) with each of the network sensor devices (805).

The data collection system (810) includes an information processing system with data communication interfaces that collect signals from the sensor units (805). The collected signals, in this example, represent detailed spectral data from each sensor device that has detected radiation.

The data collection system (810) is communicatively coupled with a local controller and monitor system (840). The local system (840) comprises an information processing system that includes a computer, memory, storage, and a user interface such a display on a monitor and a keyboard, or other user input/output device. In this example, the local system also includes a multi-channel analyzer 842 and a spectral analyzer (843).

The multi-channel analyzer (MCA) (842) comprises a device composed of many single channel analyzers (SCA). The single channel analyzer interrogates spectral data from the individual sensors (805) or from the sensor group. The spectral image or spectral histograms are accumulated.

The spectral data is used by the spectral analysis system (843) to identify target chemical, biological, radiological or explosives (CBRNE) materials that are present. One of the functions performed by the information processing system is spectral analysis, performed by the spectral analyzer (843), to identify the one or more target materials. With respect to target material detection and identification, the spectral analyzer (843) compares one or more spectral images of the materials that are present to known materials that are represented by one or more spectral images stored in the known material database (850). By capturing multiple variations of target materials there are numerous images that can be compared to one or more spectral images of the target materials present. The known database (850) holds the one or more spectral images of each isotope to be identified. These multiple spectral images represent various levels of acquisition of spectral data so target materials can be compared and identified using various amounts of spectral data available from the one or more sensors. Whether there are small amounts (or large amounts) of data acquired from the sensor, the spectral analysis system (843) compares the acquired data from the sensor to one or more spectral images for each target material to be identified. This significantly enhances the reliability and efficiency of matching acquired spectral image data from the sensor to spectral image data of each possible target material to be identified. Once the one or more possible target materials are determined present in the spectral data detected by the sensor(s), the information processing system can compare the target material mix against possible materials, goods, and/or products, that may be under examination.

The spectral analysis system (843), according to an embodiment, includes an information processing system and software that analyzes the data collected and identifies the isotopes that are present.

An example spectral analysis software system could consist of more that one method to provide multi-confirmation of the isotopes identified. Should more than one isotope be present, the system identifies the ratio of each isotope present. Examples of methods that can be used for spectral analysis such as in the spectral analysis software according to an embodiment of a container contents verification system, include: 1) a margin setting method as described in U.S. Pat. No. 6,847,731; and 2) a LINSCAN method (a linear analysis of spectra method) as described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference By operating the system remotely, such as from a central monitoring location, a larger number of sites can be safely monitored by a limited number of supervisory personnel. It should be clear that many different applications can benefit from the network enables sensors. For example, fork lift truck network enabled sensor units communicating with a remote monitoring system allow CBRNE detection and identification for a large number of applications such as at ports, railway, and intermodal stations, and at ships, airplanes, trucks, warehouses, and other carrier environments, and at cities, roadway, transport, subways and at such other places that have a need for monitoring CBRNE materials and identifying CBRNE materials as should be understood by those of ordinary skill in the art in view of the present discussion. This network enabled monitoring capability, both local and remote monitoring, and at a significantly reduced cost of deploying and running such a monitoring system, provides a significant commercial advantage.

The preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

An embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allows a computer to read such computer readable information.

In another embodiment, the SIM provides support functions for the CBRNE sensors such as calibration, synchronization and SIM and sensor health diagnostics.

The ability to maintain a calibrated signal across one or more analog/digital detectors is required to provide accurate sensor data to the spectral analysis software for detection and identification of the materials present.

The calibration of multiple analog/digital sensors in an array is a time consuming process. Once the sensors have been deployed, the ability to re-calibrate is expensive and may require extensive engineering support. The ability to use an automated calibration method provides for a more effective and useful sensor system. The ability to maintain the calibration for extended periods of time and eliminate analog signal drift ensures that the sensor will provide accurate information. In addition, the ability to test the accuracy of the sensor calibration as part of an automated sensor test capability provides for calibration verification and the decision for using automated calibration tools. The SIM also provides a sensor interface that can address any commercial off the shelf or proprietary sensor with minimal impact.

As an example, automated calibration methods are used to support radiation sensors. This is accomplished through the use of check sources to enable meaningful calibration of sensors such as gamma ray scintillation detectors used for capturing data to be used in isotope identification. The following example uses two sources, one for calibration against a low-end energy source and a second for calibration against a high-end energy source. The hardware calibration is completed and documented for each of the detectors within the array. The software device collecting the spectral data can also perform a secondary calibration to fine-tune the calibration for extreme accuracy.

The following is offered as an example of the automated sensor hardware calibration. A low-end source such as Americium-241 (Am-241) of a few microCuries ($\mu$Ci) can be used to set the detector preamp gain and to establish the lower discrimination threshold. Am-241 emits both alpha and gamma radiation (alpha radiation is utilized in AmBe "chemical" neutron sources), but here we are interested in low energy or "soft" gamma rays. Am-241 produces 59.5 keV gammas with a 36% probability of decay, and 14 keV gammas with a 43% probability of decay, though the latter are so weak that few, if any, can penetrate the detector housing. An example such as a Cesium-137 (Cs-137) source of a few microCuries can be used to verify proper detector operation at higher gamma energies. Cs-137 (actually the decay product Ba-137m) emits 662 keV (0.662 MeV) gammas with a 90% probability of decay. A processor controls the gain on the sensor devices. The gain is adjusted through a software program to place the radiation detector signal from each detector within a specific calibration tolerance.

Using the Am-241 and Cs-137 check sources, the system software program adjusts the digital preamp gain so that the Am-241 gamma ray is calibrated to the match the pre defined specific spectral signature for each source.

Figure 7:
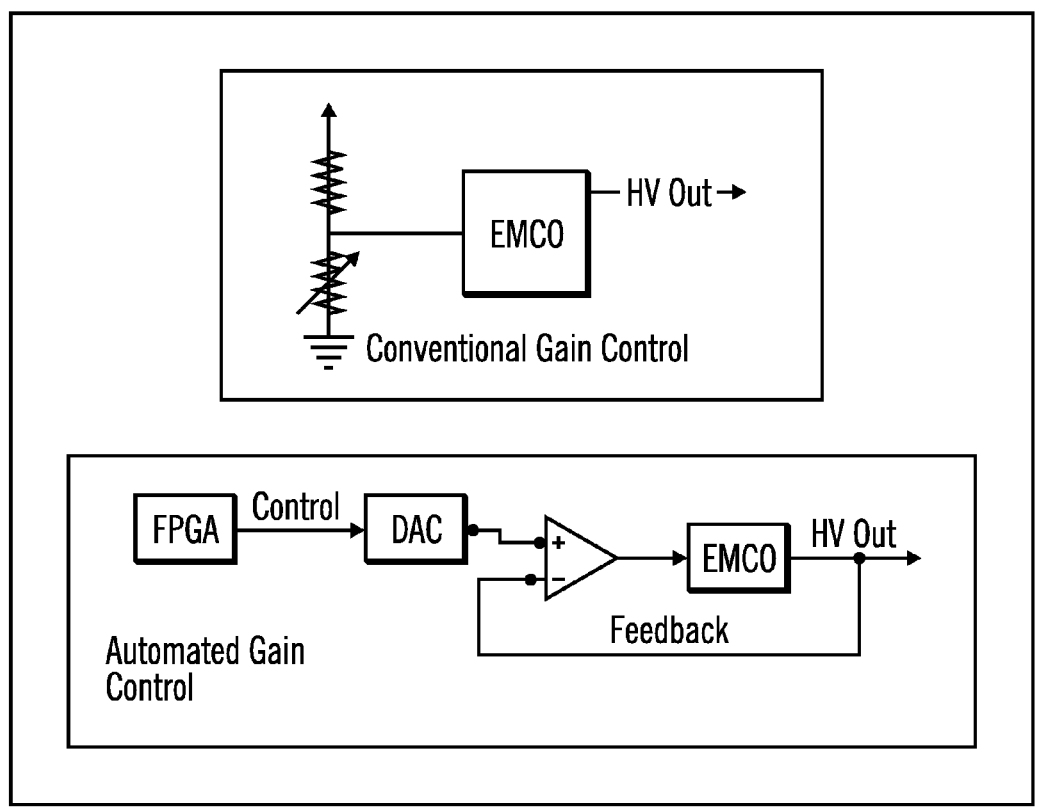
FIG. 7 is a simple schematic illustrating an example of an Automated Gain Control Circuit for use with the sensor interface system and the sensor integration module of FIG. 1.

In another example, automated gain control is accomplished through the use of a phase-locked loop (PLL). The PLL is a closed-loop feedback control system that maintains a generated signal in a fixed phase relationship to a reference signal (FIG. 7). The integrated circuit can hold a complete phase-locked loop with signal frequencies from a fraction of a cycle per second up to many gigahertz. The use of the PLL in the circuitry for an analogy sensor restricts analog signal drift. The need to have the sensor signal locked into calibration is critical for those systems that will use the sensor data to identify specific chemical, biological, radiation, nuclear or explosive materials. The pattern recognition system utilizes spectral signature of known materials to compare to the sensor data. If the sensor data is not calibrated correctly and is not maintained in calibration, the pattern recognition system can be compromised. FIG. 7 illustrates an example PLL circuit used for support of a radiation detector.

PLLs are generally built of a phase detector, low pass filter and voltage-controlled oscillator (VCO) placed in a negative feedback configuration. There may be a divider in the feedback path or in the reference path, or both, in order to make the PLL's output clock a rational multiple of the reference. By replacing the simple divide-by-N counter in the feedback path with a programmable pulse swallowing counter, it is possible to obtain fractional multiples of the reference frequency out of the PLL.

The oscillator generates a periodic output signal. Assume that initially the oscillator is at nearly the same frequency as the reference signal. Then, if the phase from the oscillator falls behind that of the reference, the phase detector causes the charge pump to change the control voltage, so that the oscillator speeds up. Likewise, if the phase creeps ahead of the reference, the phase detector causes the charge pump to change the control voltage to slow down the oscillator. The low-pass filter smoothes out the abrupt control inputs from the charge pump. Since initially the oscillator may be far from the reference frequency, practical phase detectors may also respond to frequency so as to increase the lock-in range of allowable inputs.

In another embodiment, automated calibration verification is performed through two methods. The first method tests the entire system including the detector. The second method is a partial test that uses predefined sensor output signals to verify the analog circuits supporting the detector.

In another embodiment, automated calibration is performed by analyzing an established reference signal against the incoming spectral data. The software determines is the reference signal is in proper alignment. The software can adjust the spectral data in the histogram based on the analysis of the reference signal. The software can also direct an adjustment to the detector voltage through digital potentiometers and has the capability to perform adjustments on the analog interface module connected to the detector.

Figure 6:
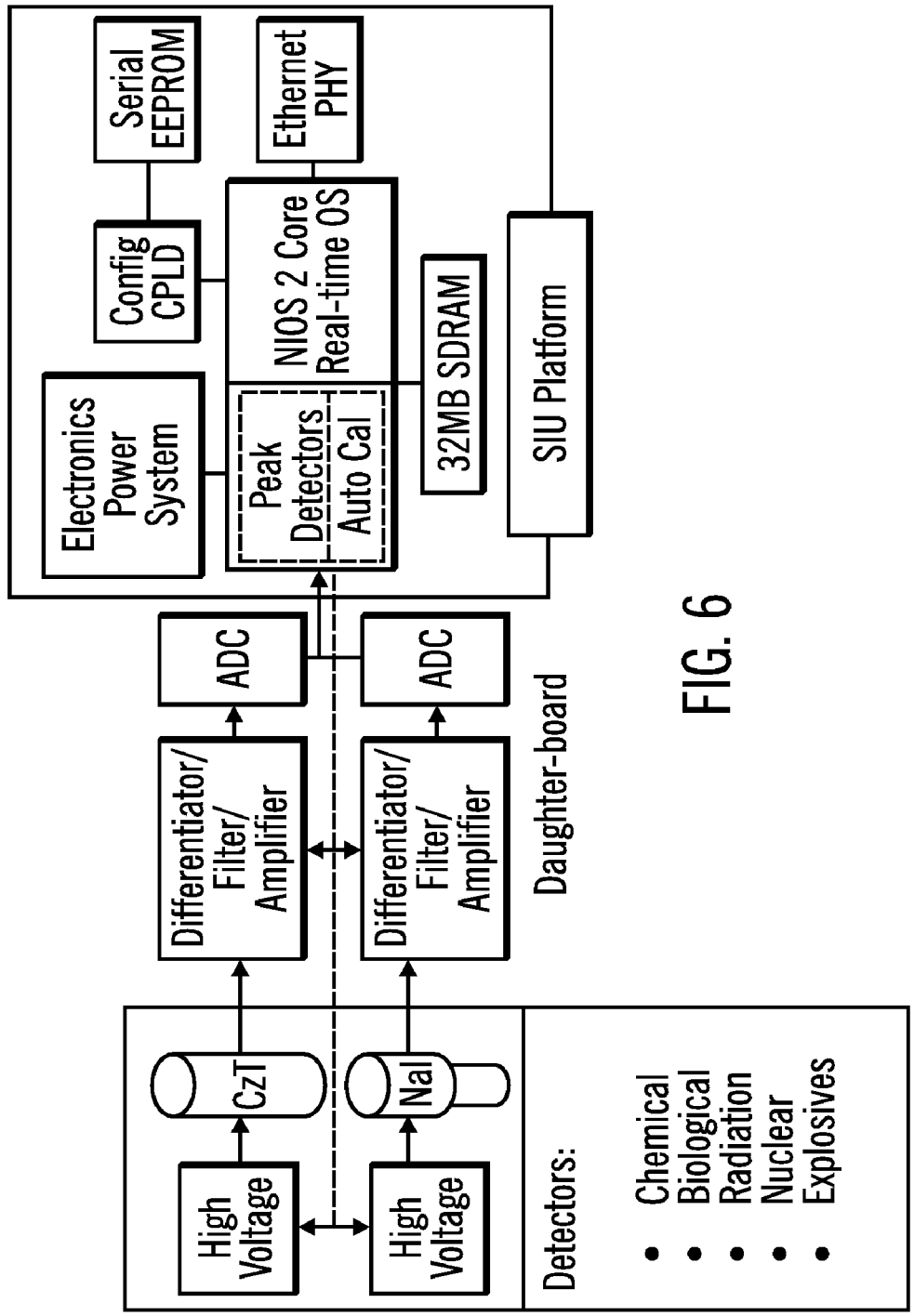
FIG. 6 is a simple schematic illustrating an example of a SIM Architecture.

In another embodiment, the Sensor Integration Module (SIM) enables interchangeable sensor interface modules contained on a daughter board. The sensors enabled can be chemical, biological, radiation, nuclear and explosives sensors. See, for example FIG. 6.

The following example for the SIM is based on a design that provides an open interface for radiation detectors based on an analog sensor interface module contained an on interchangeable daughter board. The analog section is responsible for amplifying and shaping the detector output, and converting the analog pulses to a digital signal. The digital section reads the digital signal, detects the peaks of the incoming pulses, and sends the peak data over a communications path to a processor that performs spectral analysis (FIG. 2).

Figure 3:
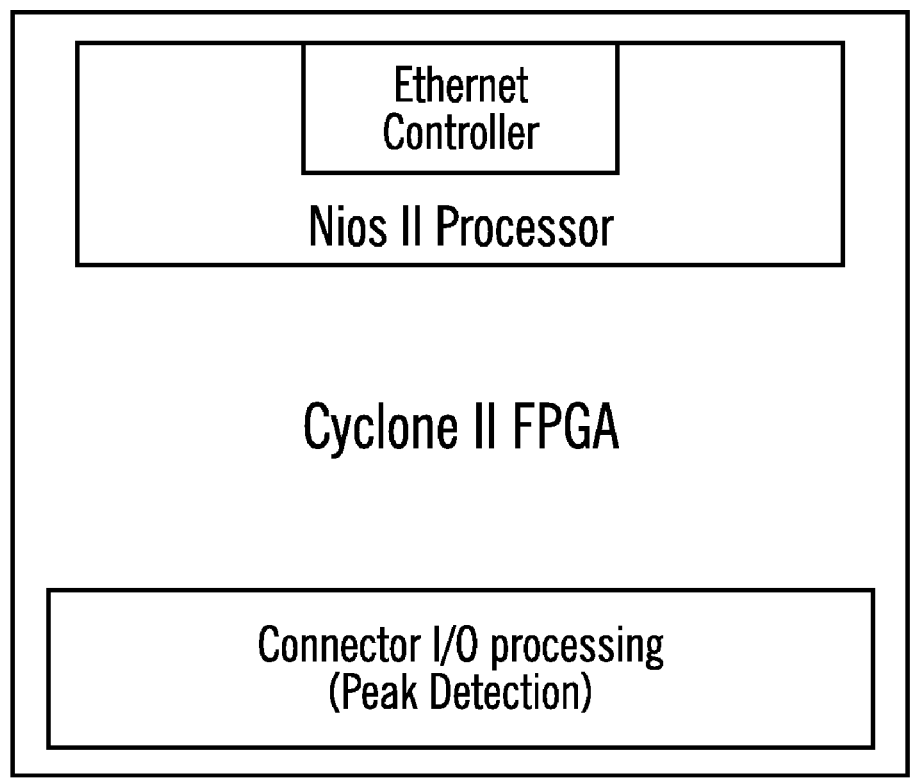
FIG. 3 is a simple schematic illustrating an example of an FPGA and embedded processor for use with the sensor interface system and the sensor integration module shown in FIG. 1.

The SIM uses a processor such as the Altera Cyclone II FPGA. An embedded Nios II processor can be placed inside of the Cyclone FPGA. The Nios processor can have an Ethernet controller and TCP/IP stack allowing it to communicate with the network (see FIG. 3).

Combining the functionality of the FPGAs and sensor processor into a single FPGA has several advantages. The communication overhead between the processor and FPGAs is eliminated in this new design. Furthermore, since the Nios processor is on the same chip as the peak detectors, the Nios can manage the detector peak-data transmission to optimize network bandwidth. An external Fast SRAM can be interfaced to the FPGA to ensure required memory capacity and enables support an extended number of sensors. The embedded Nios processor can also manage and update the FPGA's configuration over the network, allowing the unit to be automatically upgraded in the field. A digital-to-analog converter can be incorporated into the system for self-testing. The digital circuit will use the digital-to-analog converter to send test pulses to itself to ensure that all the electronics are properly working.

Figure 4:
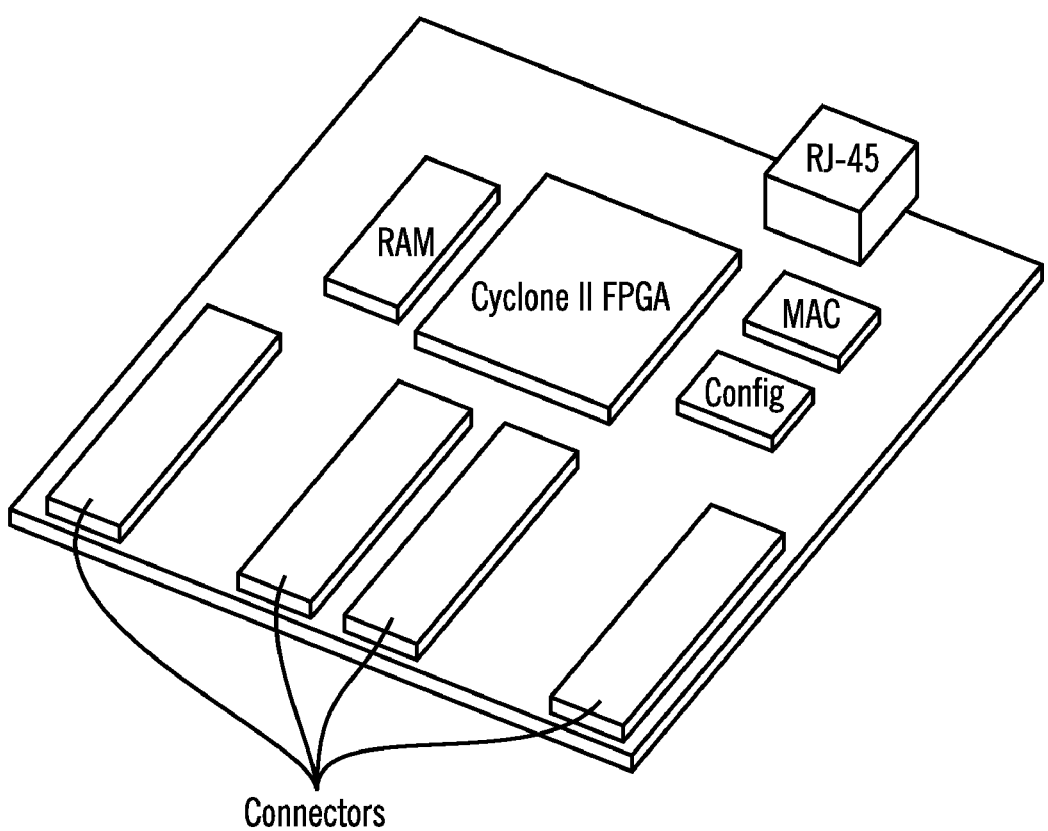
FIG. 4 is a simple schematic illustrating a SIM Control Card Digital circuit and connectors.

The Cyclone FPGA can interface to the analog circuit through a generalized I/O interface. The FPGAs I/O pins can be pulled out to a series of connectors on the SIU, as shown in FIG. 4. The connectors can support enough I/O pins to allow the FPGA to interface up to 24 detectors at once.

The analog or digital circuit is designed as a separate circuit board which can interface to the SIM as a daughter card (FIG. 2). Isolating the analog circuit could help reduce noise, and allow for a more general interface to the digital circuit.

By using a generalized interface to the digital hardware, a wide range of detectors can be interfaced to the SIM without redesigning the SIM. The analog-digital converters will be included on the daughter cards, so that new types of analog detectors can be easily interfaced to the SIM. For each new detector, or group of detectors, only a new analog daughter card would need to be designed to interface to the SIM. For example, a daughter card that supports 6 NaI and 6 CZT detectors could be connected just as easily as a daughter card that supports 8 NaI and 4 CZT detectors. The daughter cards allow for great flexibility in the design, so that an entire daughter card could be dedicated to just NaI or just CZT sensors, or a daughter card could be designed with a mixture of both NaI and CZT.

New types of detectors (chemical, biological, radiation, nuclear and explosives) can be interfaced to the SIM by designing a custom analog-daughter board. The SIM will not need to be redesigned to accommodate these new detectors. The only modification to the SIM would be a possible firmware update. This would allow systems in the field to be re-fitted, repaired, or upgraded with new detectors simply by putting in new the detectors, plugging in the new daughter boards, and updating the FPGA firmware.

Figure 5:
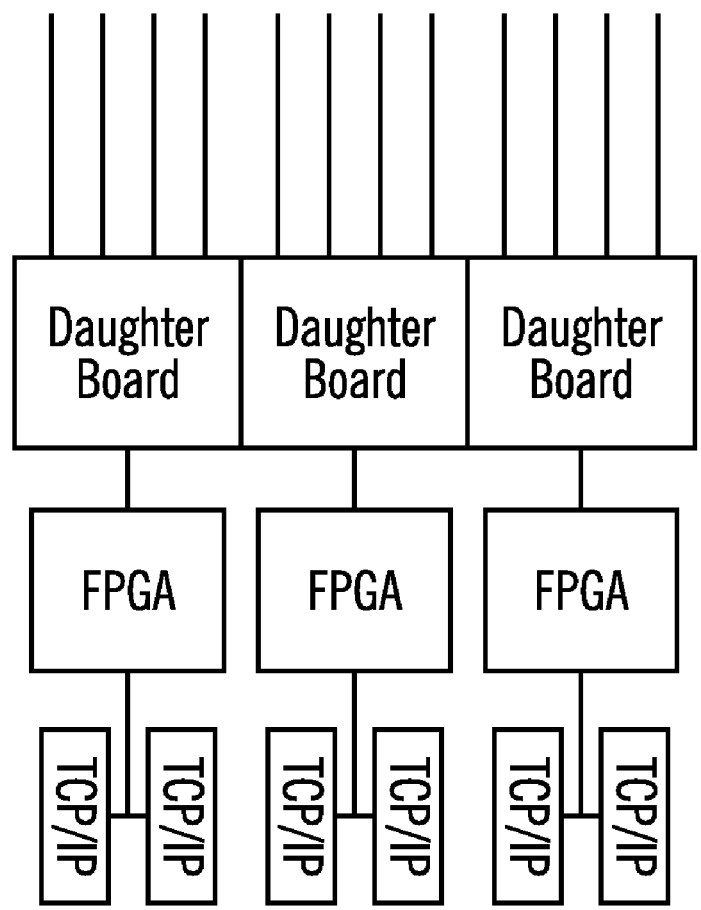
FIG. 5 is a simple schematic illustrating an example of a SIM Card redundancy with multiple FPGAs and Daughter Boards.

This design can include several FPGA-daughter board configurations working separately in parallel for redundancy purposes. As shown in (FIG. 5), a single SIU can support several FPGAs each interfaced to a dedicated daughter card. If a particular FPGA or daughter card fails, the other FPGA-daughter card systems will continue to function normally. Each FPGA can also be interfaced to two Ethernet (TCP/IP) ports in case one of the ports fails.

The SIM can be placed in the sensor box along with the NaI, CZT, neutron detectors, and the power supply boards or be configured as a stand-alone module. The control board's Ethernet ports can be connected to an internal router. The sensor can have two or more Ethernet ports to connect to the network for redundancy In another embodiment, the SIM is combined with a power supply unit to support the sensor(s). The power supply is controlled remotely through an SIM communications link to enable digital adjustments to the sensor(s) power input.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A sensor interface system for interfacing with a collection of one or more sensors that can sense chemical, biological, radiation, nuclear, and explosives (CBRNE) materials, the sensor interface system comprising:
   one or more digital and/or analog sensor interfaces for coupling with;
      chemical sensors;
      biological sensors;
      radiation sensors;
      nuclear sensors; and
      explosives sensors;
   an analog signal to digital data converter for converting signals from analog sensors, that are coupled with the one or more digital and/or analog sensor interfaces, to digital data;
   a signal processor and central processor, coupled with the one or more digital and/or analog sensor interfaces and with the analog signal to digital data converter, for receiving and processing signals from the one or more digital and/or analog sensor interfaces;
   a communications device, coupled to the signal processor and central processor, for coupling digital data representing signals from one or more sensors coupled with the one or more digital and/or analog sensor interfaces, to a communications network;
   an individual TCP/IP address associated with each of the one or more digital and/or analog sensor interfaces, and for providing network access to digital data representing signals from each one or more sensors coupled with the each one or more digital and/or analog sensor interfaces, respectively;
   a voltage power supply module, coupled with the one or more digital and/or analog sensor interfaces, for supporting one or more sensors connected to the one or more digital and/or analog sensor interfaces, respectively, and with software controls to adjust the power for calibration of the one or more sensors;
   a software control interface, coupled with the each one or more digital and/or analog sensor interfaces and with the signal processor and central processor, to couple software controls to the one or more digital and/or analog sensor interfaces to adjust for calibration of sensors coupled with the one or more digital and/or analog sensor interfaces;
   a digital data collection system, communicatively coupled with the one or more digital and/or analog sensor interfaces, for collection of sensor data from the one or more digital and/or analog sensor interfaces;
   a multi-channel analyzer system, communicatively coupled with the digital data collection system, for preparing histograms of the collected sensor data;
   a spectral analysis system, communicatively coupled with the multi-channel analyzer system and the digital data collection system, for receiving and analyzing the collected sensor data to detect radiation and to identify one or more targeted materials associated with the sensor data;
   a first data storage means for storing data representing chemical, biological, radiation, nuclear and explosives (CBRNE) material spectra for use by the spectral analysis system, where one or more spectral images stored in the first data storage unit represent each CBRNE material the first data storage means being communicatively coupled with the spectral analysis system;
   an information processing system, communicatively coupled with the spectral analysis system, for analyzing the identified one or more targeted CBRNE materials and to determine the possible materials or goods that they represent; and
   a second data storage means for storing data representing a manifest relating to a container or object under examination, the second data storage means being communicatively coupled with the information processing system, the information processing system further for comparing the determined possible materials or goods with a manifest relating to a container or object under examination to determine if there are unauthorized materials or goods contained within the container, or in the object, under examination.

2. The system of claim 1, wherein the one or more digital and/or analog sensor interfaces are mounted on one daughter board.

3. The system of claim 1, wherein at least one of the one or more digital and/or analog sensor interfaces is for connecting with one or more radiation detectors of any of the types of neutron, alpha particle, or beta particle detectors.

4. The system of claim 1, wherein at least one of the one or more digital and/or analog sensor interfaces is for directly connecting with one or more detectors of any of the types of chemical, biological or explosives detectors.

5. The system of claim 1, wherein the one or more digital and/or analog sensor interfaces and the voltage power supply module are combined and integrated into a detector design to provide a network enabled sensor interface for detecting chemical, biological, radiation, nuclear or explosives materials.

6. The system of claim 1, further comprising at least one wireless or wire-line communications system to transport the digital data, via network access using TCP/IP addresses, from one or more digital and/or analog sensor interfaces coupled with one or more radiation sensors to the digital data collection system.

7. The system of claim 1, wherein the one or more digital and/or analog sensor interfaces and the voltage power supply module are combined and integrated into a detector design to provide a network enabled sensor interface for detecting chemical, biological, radiation, nuclear, or explosive materials, and further comprising:
   a radiological source, integrated into the network enabled sensor interface, that may be continuously or periodically exposed to a radiation detector that is coupled with the network enabled sensor interface to provide a reference signal used for calibration of the radiation detector.

8. The system of claim 1, wherein the one or more digital and/or analog sensor interfaces and the voltage power supply module are combined and integrated into a detector design to provide a network enabled sensor interface for detecting chemical, biological, radiation, nuclear, or explosive materials, and further comprising:
   an internet communications interface coupled with the network enabled sensor interface to provide a web-detector where multiple users over the internet can connect to the network enabled sensor interface and can obtain digital data from a radiation detector that is coupled with the network enabled sensor interface.

9. The system of claim 1, wherein the one or more radiation sensors coupled with the one or more digital and/or analog sensor interfaces are either continuously exposed or selectively exposed to a trace level of a radiological material to provide a reference signal for use in calibrating the radiation sensors.

10. The system of claim 9, wherein the multi-channel analyzer system uses the reference signal associated with the one or more radiation sensors to adjust the collected radiation data from the one or more radiation sensors to obtain proper calibration of the collected radiation data.

11. The system of claim 1, wherein the spectral analysis system analyzes the collected sensor data to detect and to identify one or more CBRNE materials associated with the detected sensor data by using software on a computer program product for providing instructions to an information processing system.

12. The system of claim 1, further comprising a network server, communicatively coupled with the signal processor and central processor, the digital data collection system, the multi-channel analyzer system, and the spectral analysis system, to enable one or more users over a network to access information from the network server relating to at least one of: digital data representing signals from each one or more sensors, software controls to the one or more digital and/or analog sensor interfaces, collected sensor data, histograms data, and detection of radiation and identification of one or more targeted materials associated with the collected sensor data.

13. The system of claim 1, further comprising a TCP/IP network communications interface for network communications with the communications device via TCP/IP communication protocol.

14. The system of claim 1, wherein the communications device provides an open communications interface to enable network communications with another networked device via any conventional network communications protocol.

15. The system of claim 1, wherein a peak detector is incorporated into at least one of the one or more digital and/or analog sensor interfaces for the multi-channel analyzer system to identify a detected energy range from the collected sensor data.

16. The system of claim 1, wherein a peak detector is incorporated into the multi-channel analyzer system to identify a detected energy range from the collected sensor data.

17. A sensor integration module for coupling sensor data between a collection of one or more sensors that can sense chemical, biological, radiation, nuclear, and explosives (CBRNE) materials, and a sensor data analyzer system that collects and processes the sensor data to identify one or more targeted CBRNE materials associated with the sensor data, the sensor integration module comprising:
 one or more digital and/or analog sensor interfaces for coupling with;
  chemical sensors;
  biological sensors;
  radiation sensors;
  nuclear sensors; and
  explosives sensors;
 an analog signal to digital data converter for converting signals from analog sensors, that are coupled with the one or more digital and/or analog sensor interfaces, to digital data;
 a signal processor and central processor, coupled with the one or more digital and/or analog sensor interfaces and with the analog signal to digital data converter, for receiving and processing signals from the one or more digital and/or analog sensor interfaces;
 a communications device, coupled to the signal processor and central processor, for coupling digital data representing signals from one or more sensors coupled with the one or more digital and/or analog sensor interfaces, to a communications network;
 an individual TCP/IP address associated with each of the one or more digital and/or analog sensor interfaces, and for providing network access to digital data representing signals from each one or more sensors coupled with the each one or more digital and/or analog sensor interfaces, respectively, and wherein a sensor data analyzer system can be communicatively coupled with the sensor integration module via the communications network to collect and analyze the digital data representing signals from the each one or more sensors via TCP/IP communications over the communications network;
 a voltage power supply module, coupled with the one or more digital and/or analog sensor interfaces, for supporting one or more sensors connected to the one or more digital and/or analog sensor interfaces, respectively, and with software controls to adjust the power for calibration of the one or more sensors; and
 a software control interface, coupled with the each one or more digital and/or analog sensor interfaces and with the signal processor and central processor, to couple software controls to the one or more digital and/or analog sensor interfaces to adjust for calibration of one or more sensors coupled with the one or more digital and/or analog sensor interfaces.

18. The sensor integration module of claim 17, further comprising:
 an internet communications interface communicatively coupled with the communications device to provide a web-detector where multiple users over the internet can connect to the sensor integration module to obtain the digital data representing signals from the each one or more sensors for processing and analyzing the digital data by a remotely located sensor data analyzer system to remotely identify one or more targeted CBRNE materials associated with the sensor data.

19. The sensor integration module of claim 18, wherein the sensor integration module provides the digital data representing signals from the each one or more sensors that comprises information for the remotely located sensor data analyzer system to spectrally analyze identified one or more targeted CBRNE materials and to determine the possible materials or goods that they represent.

* * * * *